United States Patent

Tominaga et al.

[11] Patent Number: 5,637,372
[45] Date of Patent: Jun. 10, 1997

[54] PHASE CHANGE OPTICAL RECORDING MEDIUM

[75] Inventors: Junji Tominaga; Ryo Inaba; Masanori Kosuda; Tatsuya Kato, all of Nagano, Japan

[73] Assignee: TDK Corporation, Tokyo, Japan

[21] Appl. No.: 614,307

[22] Filed: Mar. 12, 1996

[30] Foreign Application Priority Data

Mar. 31, 1995 [JP] Japan ................... 7-099945

[51] Int. Cl.⁶ .................... B32B 3/00
[52] U.S. Cl. ............. 428/64.1; 428/64.2; 428/64.4; 428/64.5; 428/913; 430/270.13; 430/495.1; 430/945; 369/283; 369/288
[58] Field of Search ............. 428/64.1, 64.2, 428/64.4, 64.5, 913; 430/270.1, 270.11, 270.12, 270.13, 495.1, 945; 369/283, 288

[56] References Cited

U.S. PATENT DOCUMENTS 5,389,417  2/1995  Tominaga et al.
5,418,030  5/1995  Tominaga et al. .................. 428/64

FOREIGN PATENT DOCUMENTS 3-240590  10/1991  Japan .
4-232779   8/1992  Japan .
6-166268   6/1994  Japan .

*Primary Examiner*—William Krynski
*Assistant Examiner*—Elizabeth Evans
*Attorney, Agent, or Firm*—Watson Cole Stevens Davis PLLC

[57] ABSTRACT

In an optical recording medium comprising a phase change recording layer on a substrate, the recording layer is essentially of the formula:

$$[\{(Ag,Au)_a(Sb,Bi)_b(Te,Se)_c\}_{1-d}(In,Al,P)_d]_{1-e}(Si,Ge,Sn,Pb)_e$$

wherein $0.001 \leq a \leq 0.20$, $0.40 \leq b \leq 0.90$, $0.10 \leq c \leq 0.50$, $a+b+c=1$, $0<d \leq 0.06$, and $0.001 \leq e \leq 0.10$. The medium can be overwritten at a high linear velocity and remains reliable when stored at elevated temperature.

2 Claims, 1 Drawing Sheet

PHASE CHANGE OPTICAL RECORDING MEDIUM

BACKGROUND OF THE INVENTION

1. Field of the Invention

This invention relates to an optical recording medium adapted to record information in a recording layer by irradiating a light beam thereto to induce a crystal-lographic change.

2. Prior Art

Highlight is recently focused on optical recording media capable of recording information at a high density and erasing the recorded information for overwriting. One typical rewritable optical recording medium is of the phase change type wherein laser light is directed to the recording layer to change its crystallographic state whereupon a change of reflectance by the crystallographic change is detected. Optical recording media of the phase change type are of great interest since they can be overwritten by a single light beam and operated by a drive unit with a relatively simple optical system as compared with magneto optical recording media.

Most optical recording media of the phase change type used Ge-Te systems which provide a substantial difference in reflectance between crystalline and amorphous states and have a relatively stable amorphous state. It was recently proposed to use new compounds known as chalcopyrites. Chalcopyrite compounds were investigated as compound semiconductor materials and have been applied to solar batteries and the like. The chalcopyrite compounds are composed of Ib-IIIb-VIb$_2$ or IIb-IVb-Vb$_2$ as defined in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228.

Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai (JP-A) No. 240590/1991, 99884/1991, 82593/1991, 73384/1991, and 151286/1992.

In addition to these phase change type optical recording media using chalcopyrite compounds, JP-A 267192/1992, 232779/1992, and 166268/1994 disclose phase change type optical recording media wherein a recording layer crystallizes to create an AgSbTe$_2$ phase.

Japanese Pat. application Nos. 108996/1992, 79267/1992, 253832/1992, 17968/1993, 341818/1993, and 87854/1994 by the inventors disclose phase change optical recording media having recording layers of a quaternary system of Ag, Sb, Te, and In to which V, Ti or the like is added for imparting stability to the recording layer at a relatively low linear velocity range of about 1.2 to 2.8 m/s for improving reliability.

In the case of high density image recording, however, it is necessary to increase the linear velocity for accomplishing high speed overwriting. Overwriting of a recording layer composed mainly of Ag, Sb, Te, and In is carried out by applying a recording power to spots where record marks are to be formed while adding a biasing power to the laser light source. The biasing power is weaker than the recording power. Application of the biasing power causes amorphous portions to crystallize and crystalline portions to re-crystallize whereby previous record marks are erased to resume the initialized state. Since the cooling rate after irradiation of laser light depends on the linear velocity of the medium, the recording layer must have a crystal transition rate (the rate at which an amorphous or microcrystalline material grows into coarse crystals) corresponding to the linear velocity before such overwriting can be done. To achieve high speed overwriting by increasing the linear velocity, the crystal transition rate of the recording layer must be accelerated. This may be achieved by increasing the relative content of antimony (Sb) and decreasing the relative content of tellurium (Te). Even when the adjustment of Sb and Te is employed, high speed overwriting encounters a certain limit above which erasing properties are unsatisfactory. Additionally, a recording layer with increased Sb and decreased Te has a lower activation energy so that record marks are likely to crystallize, indicating that the medium is less reliable during storage at elevated temperature. For example, those media having vanadium added to the recording layer for reliability improvement which are recorded at a linear velocity of 4 m/s or higher have the problem that amorphous record marks crystallize in about 200 hours during storage in an environment at 80° C.

SUMMARY OF THE INVENTION

Therefore, an object of the present invention is to provide a phase change type optical recording medium capable of overwriting at a high linear velocity and having improved reliability after storage in an elevated temperature environment.

According to the present invention, there is provided an optical recording medium comprising a phase change recording layer on a substrate. The recording layer comprises a main component of the following formula.

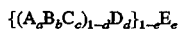

$$\{(A_aB_bC_c)_{1-d}D_d\}_{1-e}E_e$$

In the formula, A is silver (Ag) and/or gold (Au), B is antimony (Sb) and/or bismuth (Bi), C is tellurium (Te) and/or selenium (Se), D is indium (In) or a mixture of indium (In) and aluminum (Al) and/or phosphorus (P), E is at least one element selected from the group consisting of silicon (Si), germanium (Ge), tin (Sn), and lead (Pb). Letters a, b, c, d, and e representing atomic ratios fall in the range: $0.001 \leq a \leq 0.20$, $0.40 \leq b \leq 0.90$, $0.10 \leq c \leq 0.50$, $a+b+c=1$, $0 < d \leq 0.06$, and $0.001 \leq e \leq 0.10$.

Preferably the recording layer further contains at least one element M selected from the group consisting of Ti, Zr, Hf, V, Nb, Ta, Fin, W, and Mo. The content of M in the recording layer is up to 5 at %.

According to the invention, element E is added to a phase change recording layer based on an ABC$_2$ phase such as AgSbTe$_2$ phase. The addition of element E leads to a significant increase of crystal transition rate, enabling overwriting at a high linear velocity. Advantageously, since the element E added does not invite a lowering of activation energy of the recording layer, the recording layer remains highly reliable during storage in an elevated temperature environment. By adjusting the amount of element E added, the linear velocity at which the recording layer can be overwritten can be freely controlled while maintaining high reliability.

Although the addition of element M for stabilizing record marks will retard the crystal transition rate, the concurrent addition of element E suppresses any lowering of the crystallization rate. Then higher reliability is obtained without sacrificing overwrite properties at a high linear velocity.

BRIEF DESCRIPTION OF THE DRAWINGS

These and further features of the present invention will be apparent with reference to the following description and drawings, wherein.

the only figure.

DETAILED DESCRIPTION OF THE INVENTION

Figure 1:
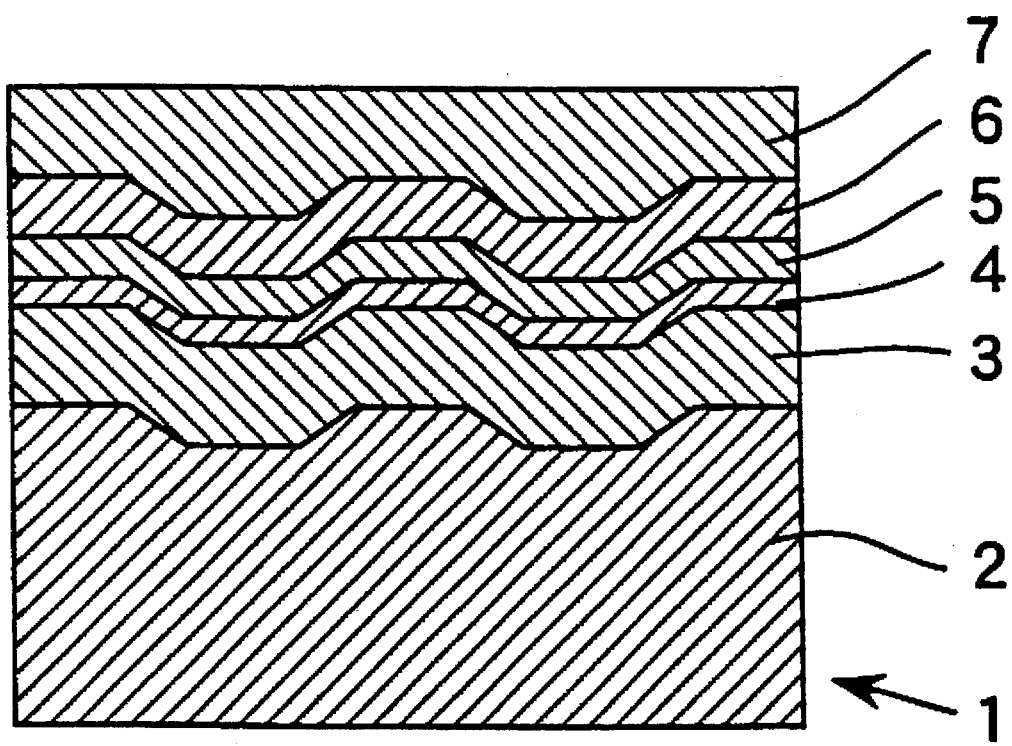
FIG. 1 is a schematic cross-sectional view of an optical recording medium according to one embodiment of the invention.

An optical recording medium has a phase change recording layer on a substrate. The recording layer contains elements A, B, C, D and E wherein A is silver (Ag) and/or gold (Au), B is antimony (Sb) and/or bismuth (Bi), C is tellurium (Te) and/or selenium (Se), D is indium (In) or a mixture of indium and at least one of aluminum (Al) and phosphorus (P), and E is at least one element selected from the group consisting of silicon (Si), germanium (Ge), tin (Sn), and lead (Pb). If desired, the recording layer further contains at least one element M selected from the group consisting of Ti, Zr, Hf, V, Nb, Ta, Fin, W, and Mo.

This recording layer is recorded such that unrecorded areas are crystalline and record marks are amorphous or microcrystalline.

The unrecorded area preferably contains an $ABC_2$ phase such as $AgSbTe_2$ phase as a crystalline phase. The $ABC_2$ phase is mainly responsible for a change of reflectance of the recording layer. More preferably, the unrecorded area contains a B phase such as Sb phase as well as the $ABC_2$ phase. The B phase is a crystalline phase.

Element D in the recording layer is present bound to C, specifically as a D–C phase such as In–Te phase in the unrecorded area. The D–C phase is a crystalline phase composed mainly of D and C wherein D:C is regarded substantially 1:1.

The presence of the respective phases is acknowledgeable by a transmission electron microscope, electron probe microanalysis (EPMA), etc.

Element E is effective for drastically improving a crystal transition rate and enabling overwriting at a high linear velocity. It is believed that E is mainly incorporated in the B phase such as Sb phase and effectively assists in crystallization of the B phase to thereby increase the crystal transition rate of the entire recording layer. Among elements E, silicon (Si) and germanium (Ge) are more effective and silicon is especially effective. It is then preferred that silicon occupy at least 80 at %, especially 100 at % of the total of elements E.

Element M is effective for enhancing the stability of amorphous record marks for thereby improving the reliability of the medium under deleterious conditions, typically hot humid conditions. Since vanadium (V) is especially effective for reliability improvement, it is preferred that vanadium occupy at least 80 at %, especially 100 at % of the total of elements M.

In the optical recording medium of the invention, the recording layer contains a main component of the following formula:

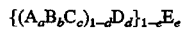

$\{(A_aB_bC_c)_{1-d}D_d\}_{1-e}E_e$ wherein A, B, C, D, and E are as defined above, letters a, b, c, d, and e representing atomic ratios fall in the range:
0.001≦a≦0.20,
0.40≦b≦0.90,
0.10≦c≦0.50,
a+b+c=1,
0<d<0.06, and
0.001≦e≦0.10.

Preferably, letters a to e fall in the range:
0.05≦a≦0.15,
0.50≦b≦0.80,
0.20≦c≦0.45,
a+b+c=1,
0.02≦d≦0.05, and
0.01≦e≦0.05.

The reason of limitation of a to e, especially to the preferred range, is described below.

Too small values of a would obstruct smooth recrystallization of recorded marks and hence, repetitive overwriting. Too large values of a would render the recording layer less reliable. That is, recorded marks would tend to crystallize during storage at elevated temperature, resulting in drops of C/N and modulation factor. Repetition of recording would facilitate deterioration of C/N and modulation factor.

If b is below the range, the proportion of B phase in the unrecorded portion would be low so that a differential reflectance concomitant with a phase change is increased, but a crystal transition rate is drastically slowed down to impede erasing. If b is beyond the range, a differential reflectance concomitant with a phase change would be reduced to provide a lower modulation factor and crystal transition would be accelerated.

If c is below the range, the amount of C to form the $ABC_2$ phase would be short and the proportion of $ABC_2$ phase declines. In turn, A becomes excessive, forming A phase and undesirable phases other than $ABC_2$ phase. Then element A little diffuses from the recorded mark to the unrecorded portion during recording, or inversely, A diffuses into the recorded marks. Reliability is little improved or rather reduced. If c is beyond the range, element C would become excessive even after formation of $ABC_2$ and D–C phases, forming a C phase which lowers a crystal transition rate to impede erasing.

If d is below the range, the proportion of D–C phase would decrease. Since the D–C phase functions to preclude growth of $ABC_2$ phase crystal grains, a lower proportion of D–C phase helps $ABC_2$ phase crystal grains grow. Then recorded marks are insufficiently rendered amorphous, resulting in drops of modulation factor and reliability. If d is beyond the range, the growth of $ABC_2$ phase crystal grains is prohibited and erasing is difficult.

If e is below the range, the crystal transition rate would be insufficiently improved so that overwriting might be possible only at low linear velocities. If e is beyond the range, as a result of repeated overwriting, much E would diffuse into the B phase to such an extent that E grains would discretely precipitate, leading to a decline of B–E phase. Then the benefits of E addition are offset, rendering repetition of high speed overwriting impossible.

Where element M is contained in addition to the above mentioned main component, the proportion of M in the recording layer is preferably up to 5 at %, more preferably up to 3 at %. If the proportion of M is too high, a differential reflectance concomitant with a phase change would become too small to provide a modulation factor. It is believed that element M functions to reduce the crystal transition rate by obstructing $ABC_2$ from changing its crystal structure. For this reason, a higher proportion of M would offset the effect of E on the B phase.

Element A is Ag and/or Au, preferably Ag. Preferably Ag occupies at least 50 atom%, more preferably at least 80 atom % of the entire A. Most preferably only Ag is used as element A. If the proportion of Au in the entire element A is too high, a crystal transition rate would be too fast to provide a satisfactory modulation factor and C/N.

Element B is Sb and/or Bi, preferably Sb. Preferably Sb occupies at least 50 atom%, more preferably at least 80 atom % of the entire B. Most preferably only Sb is used as element B. If the proportion of Bi in the entire element B is too high, a recording layer would have an increased coefficient of absorption to reduce optical interference, resulting in a reduced reflectance difference between crystalline and amorphous states and hence, a low C/N.

Element C is Te and/or Se, preferably Te. Preferably Te occupies at least 50 atom%, more preferably at least 80 atom % of the entire C. Most preferably only Te is used as element C. If the proportion of Se in the entire element C is too high, a crystal transition rate would be too slow to provide a satisfactory erasing factor.

Element D is In or a mixture of In and Al and/or P. Preferably In occupies at least 60 atom%, more preferably at least 80 atom % of the entire D. If the proportion of indium in the entire element D is too low, reliability would be low. Upon recording, in recorded marks, Ag diffuses outward and instead of Ag, In bonds with Te to form an In-Te crystal. Although microcrystalline nuclei of In-Te obstruct crystal growth of $ABC_2$ phase such as $AgSbTe_2$ phase, a smaller amount of In results in a smaller number of microcrystalline nuclei of In-Te, which allows microcrystalline nuclei of $ABC_2$ to bind together to grow. This implies that recorded marks are less stable. The proportion of Al and P is not critical.

In addition to the above-mentioned elements, the recording layer may contain a minor amount of impurities, for example, Cu, Ni, Zn, Fe, oxygen, nitrogen, carbon and hydrogen. The total amount of these impurities should preferably be up to 0.05 atom%.

The composition of the recording layer is determinable by electron probe microanalysis (EPMA), X-ray microanalysis, etc.

The recording layer generally has a coefficient of absorption k of about 3.3 in a crystalline state and about 2.2 in a microcrystalline or amorphous state.

The recording layer preferably has a thickness of about 10 to 50 nm, especially about 13 to 30 nm. If the recording layer is too thin, the growth of a crystalline phase would be retarded and a reflectance change concomitant with a phase change would become insufficient. If the recording layer is too thick, much A would diffuse through the recording layer in a direction perpendicular to its surface and less A would diffuse through the recording layer in a direction parallel to its surface (or in-plane direction) upon formation of a recorded mark, resulting in the recording layer losing reliability.

The recording layer may be formed by conventional processes, preferably sputtering and evaporation processes, most often sputtering. For sputtering, a single alloy target may be used. A multiple source sputtering technique using a plurality of targets of metals alone or alloys is also useful. Since the recording layer is amorphous as sputtered or deposited, it must be initialized before recording. Initialization is often accomplished by bulk erasing for effecting crystallization of the recording layer.

It is possible to form a crystallized recording layer by dividing the sputtering process into two or three steps. More specifically, the recording layer forming step includes in an adjacent manner the step of sputtering an A-C base metal composed mainly of elements A and C and the step of sputtering a B base metal composed mainly of element B. The B base metal may contain D. Alternatively, the recording layer forming step may include adjacent to the B base metal sputtering step, the step of sputtering a D base metal composed mainly of D. E and M may be contained in at least one of the A-C base metal, B base metal and D base metal. This divided sputtering process does not form part of the present invention, but is the subject matter of the copending application (corresponding to Japanese Pat. application No. 47822/1995 filed Feb. 13, 1995).

Referring to FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2.

Since the optical recording medium is adapted to be recorded and read by directing a light beam to the recording layer 4 through the substrate 2, the substrate 2 is preferably formed of a material substantially transparent to such a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disc shape having a diameter of about 50 to 360 mm and a thickness of about 0.5 to 3 mm. The substrate surface may be provided with a predetermined pattern of grooves for tracking and addressing purposes.

The lower dielectric layer 3 plays the role of preventing oxidation of the recording layer 4 and protecting the substrate by shutting off the heat which can otherwise conduct from the recording layer to the substrate upon recording. The upper dielectric layer 5 plays the role of protecting the recording layer and helps the heat remaining in the recording layer after completion of recording release through heat transfer. The lower and upper dielectric layers 3 and 5 are made of any desired dielectric material, for example, silicon oxide such as $SiO_2$, silicon nitride such as $Si_3N_4$, zinc sulfide such as ZnS, mixtures thereof, various transparent ceramics and various species of glass. Also useful are so-called LaSiON materials containing La, Si, O, and N, so-called SiAlON materials containing Si, Al, O, and N, SiAlON containing yttrium, etc. Preferred among these are those materials having a refractive index of at least 1.4, especially at least 1.8 in the wavelength range of 400 to 850 nm. This wavelength range covers 780 nm which is the wavelength used in current CD players and 680 nm which is a candidate wavelength of the next generation recording technology and represents the range over which the optical recording medium of the invention is advantageously operated. Preferred examples of the dielectric material are $Si_3N_4$, a mixture of ZnS and $SiO_2$, a mixture of ZnS and $Si_3N_4$, and a mixture of ZnS and $Ta_2O_5$.

The lower dielectric layer 3 is preferably about 50 to 300 nm thick, more preferably 100 to 250 nm thick. Within this thickness range, the lower dielectric layer is effective for preventing any damage to the substrate upon recording and higher modulation is available. The upper dielectric layer 5 is preferably about 10 to 60 nm thick. This thickness range ensures a fast cooling rate and thus permits to define a recorded mark with a clear edge, resulting in reduced jitter. Also higher modulation is available. Each of the upper and lower dielectric layers 3 and 5 may be formed of two or more dielectric laminae of different compositions as will be described later. The dielectric layers are preferably formed by gas phase growth methods such as sputtering and evaporation.

The reflective layer 6 may be formed of any desired material, typically high reflectance metals, for example, Al, Au, Ag, Pt, and Cu alone or alloys containing at least one of these metals. The reflecting layer is preferably about 30 to 150 nm thick. Reflectance would be short with a thickness below this range. A thickness beyond this range would provide no further improvement in reflectance and add to the cost. The reflecting layer is preferably formed by gas phase growth methods such as sputtering and evaporation.

The protective layer 7 is provided for improving scratch resistance and corrosion resistance. Preferably the protective layer is formed of organic materials, typically radiation curable compounds or compositions thereof which are cured with radiation such as electron and UV radiation. The protective layer is generally about 0.1 to 100 μm thick and may be formed by conventional techniques such as spin coating, gravure coating, spray coating, and dipping.

In another preferred embodiment of the invention, in order that the optical recording medium have a higher reflectance, the lower dielectric layer includes at least one laminate consisting of two dielectric laminae having different refractive indexes. The dielectric lamina having a higher refractive index in the laminate is disposed adjacent to the substrate. In this embodiment, a high refractive index layer, a low refractive index layer, a recording layer, an upper dielectric layer, a reflective layer, and a protective layer are deposited on a substrate in the described order.

Described below is how to operate the optical recording medium of the invention for writing and reading.

After manufacture of the optical recording medium of the invention, the recording layer is initialized or crystallized if necessary. For recording, a recording light beam, typically laser beam is directed to the recording layer in crystalline state to define a spot whereby the recording material is melted within the irradiated spot. After removal of the recording light beam, the temperature of the spot drops quickly so that the spot becomes substantially amorphous or microcrystalline to form a recorded spot or mark.

When it is desired to rewrite the recorded information, a recording light beam is directed to a spot of the recording layer where a signal is to be newly written while an erasing light beam is continuously directed to the remaining spots. The spots where the erasing light beam is irradiated are heated, but the temperature is relatively low and does not exceed the melting point of the recording material because the erasing light beam is of relatively low power as compared with the recording light beam. However, the erasing light beam is irradiated over a wide area, the resultant heat accumulation provides a gentle temperature gradient so that the cooling rate is slower than the crystal transition rate, allowing for crystallization. The record spot is once melted upon exposure to the recording light beam, but remains in the amorphous or microcrystalline state because the heat is quickly diffused toward the reflective layer. Accordingly, upon rewriting, whether the recording material is crystalline or amorphous (or microcrystalline) before irradiation, those portions irradiated with the recording light beam all become amorphous (or microcrystalline) and those portions irradiated with the erasing light beam all become crystalline. Overwrite recording is done in this way. Such overwrite recording can be carried out by using a single light beam which is modulated into recording and erasing light beams. With a biasing power added to the laser light source, a recording power is added where record marks are to be formed.

Preferably the recording light beam is emitted in pulses. By recording a single signal with two or more pulses of irradiation, the heat accumulation at the record mark is minimized and the swelling of a trailing edge of the record mark known as a teardrop phenomenon is minimized, resulting in improved C/N. The pulse irradiation also provides an increased erasing coefficient.

The power of the recording light beam and the power of the erasing light beam may be empirically determined. The reading light beam should have a low power which does not affect the crystallographic state of the recording layer. Understandably the recorded marks in amorphous or microcrystalline state give a lower reflectance than the unrecorded portions in crystalline state.

Preferably the optical recording medium of the invention is operated by rotating it to provide a speed of the recording layer relative to the recording light beam (that is, relative linear velocity) of about 1 to 30 m/s, more preferably 4 to 25 m/s, especially 6 to 20 m/s, most preferably 10 to 20 m/s. The optical recording medium of the invention enables overwriting in such a high linear velocity range and ensures satisfactory reliability.

EXAMPLE

Examples of the present invention are given below by way of illustration and not by way of limitation.

Example 1

A disk-shaped substrate 2 was injection molded from polycarbonate to a diameter of 133 mm and a thickness of 1.2 mm while grooves were simultaneously formed on one major surface thereof. On the grooved surface of the substrate 2, a lower dielectric layer 3, a recording layer 4, an upper dielectric layer 5, a reflective layer 6 and a protective layer 7 were successively formed, fabricating an optical recording disk sample of the configuration shown in FIG. 1.

The lower dielectric layer was formed by sputtering ZnS and $SiO_2$ targets. The ratio of $SiO_2/(ZnS+SiO_2)$ was 15 mol %. The lower dielectric layer was 120 nm thick.

The recording layer was formed by RF sputtering a target. The target used was an antimony (Sb) target having chips of Ag, In, Te and Si attached to the surface thereof. The recording layer had a thickness of 25 nm. On analysis by inductively coupled plasma (ICP) spectrometry, the recording layer was of the composition (atomic ratio):

$$\{(Ag_aSb_bTe_c)_{1-d}In_d\}_{1-e}Si_e$$

wherein a=0.123, b=0.544, c=0.333, d=0.05, and e=0.017.

The upper dielectric layer was formed by the same procedure as the lower dielectric layer. The upper dielectric layer had a thickness of 22 nm. The reflective layer was formed to a thickness of 100 nm by sputtering an Al-Ni target. The protective layer was formed by applying a UV curable resin by spin coating and exposing to UV radiation for curing. The protective layer was 5 μm thick at the end of curing.

The optical recording disc sample was initialized by bulk erasing for crystallizing the recording layer. After the initialization, the recording layer was analyzed by a transmittance electron microscope, EPMA, and X-ray microanalysis to find a crystalline mixture of $AgSbTe_2$, Sb, SbSi, and InTe phases.

While the disc sample was rotated at a varying linear velocity, signals of 3.38 MHz were repeatedly overwritten using a recording power of 12 mW and a biasing power of 6 mW. The maximum linear velocity at which overwriting was possible was determined. This disc sample had a maximum overwritable linear velocity of 12 m/s.

While the disk sample was rotated at a linear velocity of 12 m/s, signals of 3.38 MHz were recorded and then read for measuring the C/N of the read signals. The laser beam used herein had a wavelength of 680 nm. After recording, the disc sample was stored under conditions of 80° C. and RH 80% for examining the recording layer for reliability. No loss of C/N was observed over 5,000 hours of storage.

Comparative Example 1

A comparative disc sample was prepared by the same procedure as in Example 1 except that the recording layer had a composition: $(Ag_a Sb_b Te_c)_{1-d} In_d$ wherein a, b, c and d were as in Example 1. The recording layer of this comparative sample was the recording layer of Example 1 from which silicon was omitted. This comparative sample was examined for the maximum linear velocity at which overwriting was possible as in Example 1. The comparative disc sample had a maximum overwritable linear velocity of 2.8 m/s.

A comparison between Example 1 and Comparative Example 1 reveals that simply by adding Si to the main composition of Ag-Sb-Te-In without changing its component ratio, the overwritable linear velocity can be drastically increased and high reliability is ensured.

Comparative Example 2

A comparative disc sample was prepared by the same procedure as in Example 1 except that the recording layer had a composition: $\{(Ag_a Sb_b Te_c)_{1-d} In_d\}_{1-e} V_e$ wherein a, b, c, d and e were as in Example 1. The recording layer of this comparative sample was the recording layer of Example 1 in which silicon was replaced by vanadium. This comparative sample was examined for the maximum linear velocity at which overwriting was possible as in Example 1. The comparative disc sample had a maximum overwritable linear velocity of 1.4 m/s.

A parity improvement in maximum overwritable linear velocity was acknowledged when at least part of Si in the recording layer of the disc sample of Example 1 was replaced by Ge, Sn, Pb or a mixture thereof.

An improvement as by silicon addition was obtained from disc samples similar to Example 1 when at least part of Sb in the recording layer was replaced by Bi, when at least part of Ag in the recording layer was replaced by Au, when at least part of Te in the recording layer was replaced by Se, and when part of indium in the recording layer was replaced by Al and/or P. However, when the Bi replacement exceeded 80 atom % of the Sb, the recording layer had an increased coefficient of absorption so that an optically possible differential reflectance between crystalline and amorphous states was reduced, resulting in a reduced modulation factor.

When vanadium was added to the recording layer of the disc sample of Example 1 so as to give a V content of 0.5 at %, an improvement in reliability was acknowledged despite a slight lowering of maximum overwritable linear velocity.

The advantages of the invention are evident from the results of the foregoing samples.

Japanese Patent Application No. 99945/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium, comprising:
a phase change layer on a substrate, said recording layer comprising a main component of the following formula:

$$\{(A_a B_b C_c)_{1-d} D_d\}_{1-e} E_e$$

wherein A is at least one element of silver and gold, B is at least one element of antimony and bismuth, C is at least one element of tellurium and selenium, D is indium or a mixture of indium and at least one of aluminum and phosphorus, E is at least one element selected from the group consisting of silicon, germanium, tin and lead, and letters a, b, c, d and e represent atomic ratios in the range:
$0.001 \leq a \leq 0.20$,
$0.40 \leq b \leq 0.90$,
$0.10 \leq c \leq 0.50$,
$a+b+c=1$,
$0 \leq d \leq 0.06$, and
$0.001 \leq e \leq 0.10$,
said optical recording medium being operated at a linear velocity of 4 to 30 m/s.

2. The optical recording medium of claim 1 wherein said recording layer further contains at least one element M selected from the group consisting of Ti, Zr, Hf, V, Nb, Ta, Mn, W, and Mo in an amount of up to 5 at % of the recording layer.

* * * * *